Feb. 21, 1961 E. W. HINES 2,972,263
LOCK MECHANISM
Filed May 18, 1959 2 Sheets-Sheet 1
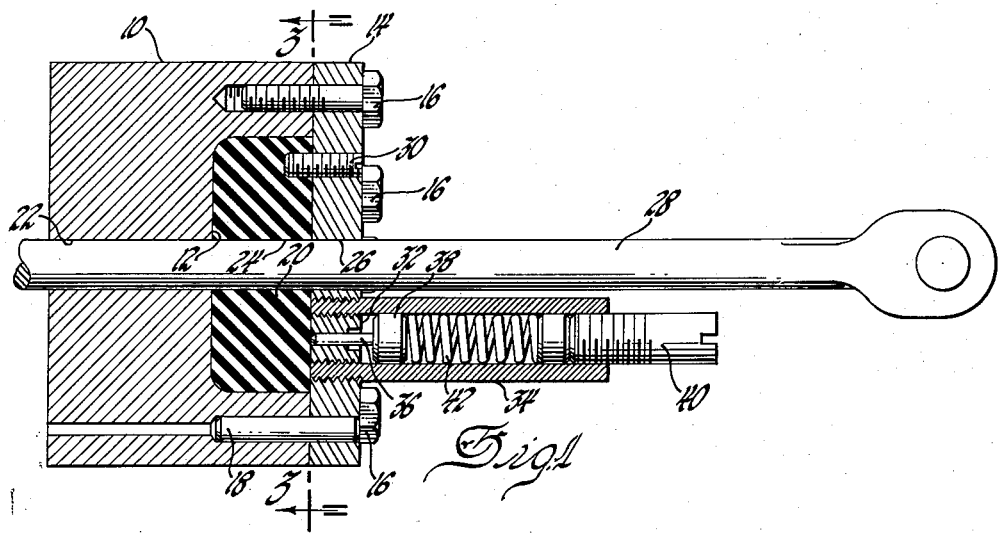
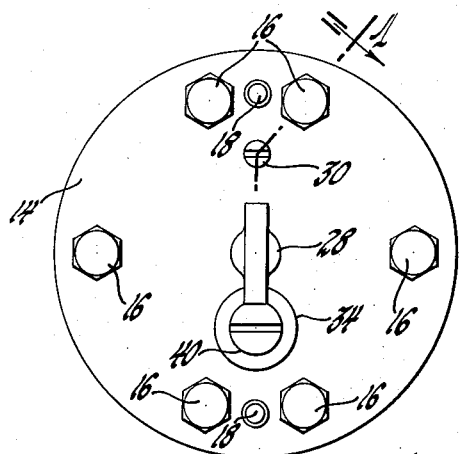
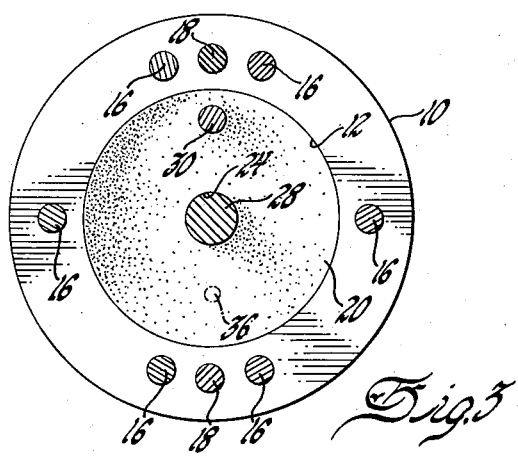
INVENTOR.
Eugene W. Hines
BY
D. D. McGraw
ATTORNEY

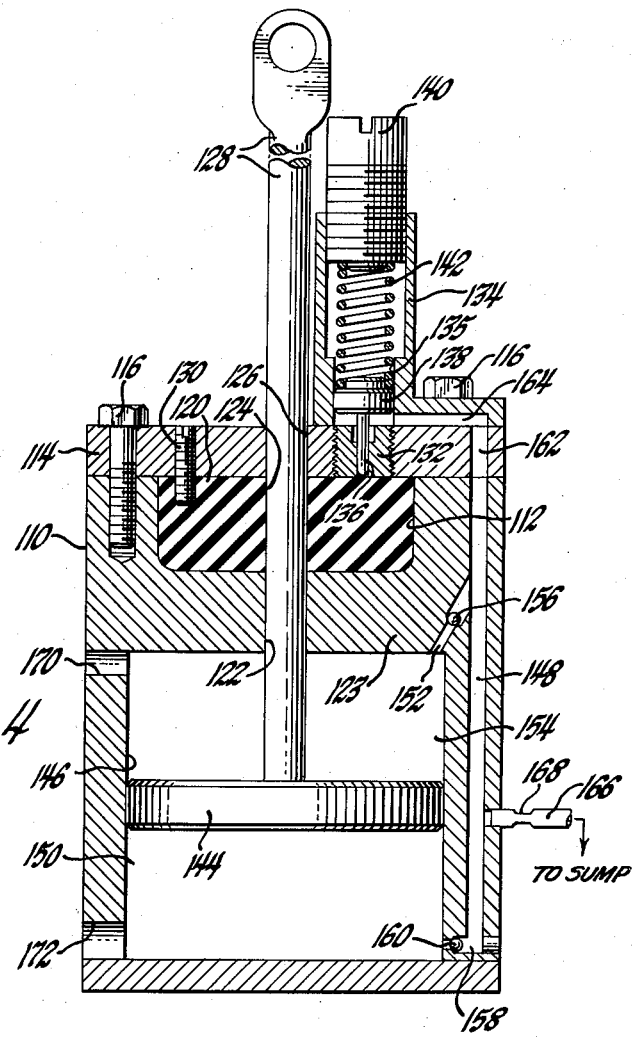
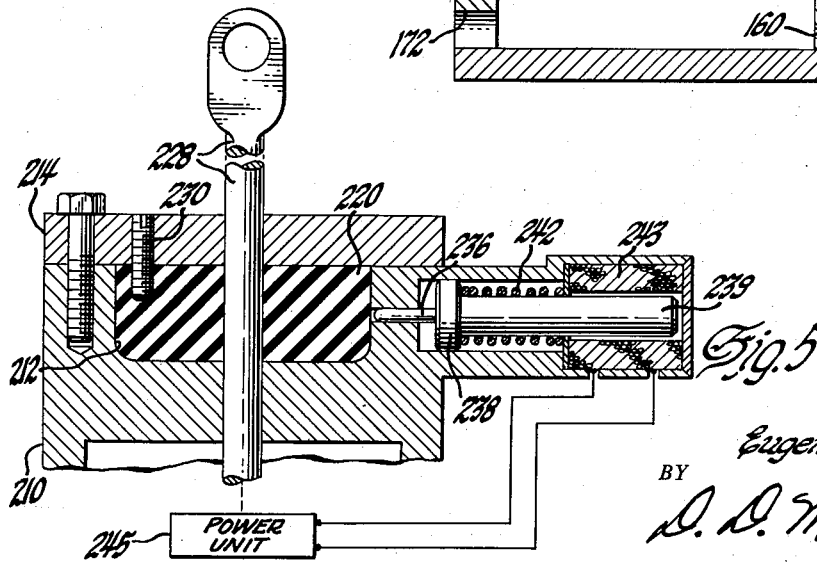

United States Patent Office 2,972,263
Patented Feb. 21, 1961

2,972,263

LOCK MECHANISM

Eugene W. Hines, 9217 Davison Road, Davison, Mich.

Filed May 18, 1959, Ser. No. 814,007

8 Claims. (Cl. 74—531)

The invention relates to mechanism for locking a reciprocable member in a desired position, and more particularly to a lock employing a resilient member having hydraulic characteristics when compressed. The lock mechanism is particularly applicable to units in which a power unit is used to move a rod in either of two directions and in which the rod is to be held against axail movement when the unit is not energized. A typical installation of such use is in a fluid servo actuated window lift mechanism in automotive vehicles.

The lock mechanism includes an element which will cause the captive resilient material to be compressed and act in a hydraulic manner so that material will tightly grip the member which is to be locked. A mechanism embodying the invention may also include a first adjustment for compressing the resilient material a sufficient amount to approach the locked condition but permit movement of the member to be locked.

In the drawings:

Figure 1 is a cross section view of a mechanism embodying the invention with parts broken away. The view is taken in the direction of arrows 1—1 of Fig. 2.

Figure 2 is an end view of the mechanism of Figure 1.

Figure 3 is a cross section view taken in the direction of arrows 3—3 of Figure 1.

Figure 4 is a cross section view of a modification of a mechanism of Figure 1 and includes fluid servos by which the lock is controlled and the reciprocable member actuated.

Figure 5 is a cross section view with parts broken away and illustrates another modification of the lock mechanism.

Mechanisms embodying the invention may be used in any structure requiring the locking of a member in a desired position. The assembly includes the retaining block or housing 10 which has a cavity 12 formed therein. A housing cover plate 14 is positioned and secured to the block portion of the housing 10 by any suitable means such as screws 16 and dowel pins 18. An insert 20 which is preferably made of a molded synthetic die rubber is fitted into the cavity 12 and substantially fills the cavity. The insert may be made of other suitable resilient material having the desired plastic and frictional characteristics. Cover plate 14 retains the insert 20 in place. Block 10 has a passage 22 extending therethrough. A passage 24 which forms an extension of passage 22 is similarly provided through insert 20. A third passage 26, which is in axial and circumferential alignment with passages 22 and 24, is provided in cover plate 14. The rod 28, which is the member to be locked in position, extends through passages 22, 24, and 26. Since these passages form, in effect, a continuous passage and are closely fitted to the rod 28, the rod is permitted to reciprocate axially relative to the remainder of the mechanism.

A rough adjustment for hydraulic pressure exerted by the confined insert may be provided by set screw 30. This screw is illustrated as being threaded through the cover plate 14 so that it is extendable into the cavity 12. Since the cavity 12 is already substantially filled by the resilient insert 20, and the movement of screw 30 into the cavity reduces the cavity volume, insert 20 is compressed and exerts a pressure comparable to a hydraulic pressure on the inner surfaces of the cavity 12 as defined by block 10, cover 14, and that portion of rod 28 which extends through insert 20. The screw may be sufficiently tightened to provide for slight engagement of the insert with the rod. Thus the pressure of the insert on the rod approaches the point at which the insert will grip the rod. The setting of the set screw 30 may be varied to approach the gripping point to the extent desired.

A second device is provided to control the hydraulic effect of the insert 20 on the rod 28. This device is illustrated as including the bushing 32, which is received within the end of cylinder 34, and the detent 36 which is extendable through bushing 32 and into the cavity 12. Cylinder 34 is attached to the cover plate 14 so that the inner end of the cylinder and the inner face of the bushing 32 are adjacent cavity 12 and insert 20. Detent 36 is movable within a passage formed in bushing 32 so that it will extend into cavity 12 by a desired and adjustable amount. The detent is illustrated as being considerably smaller in cross section area than the set screw 30 in order to provide a more accurate adjustment of the hydraulic effect.

The detent is moved by a force acting on the detent piston 38 which is reciprocable within the cylinder 34. This piston may be actuated by any suitable means such as a servomotor or a cam. It is illustrated in Figure 1, however, as being actuated by an adjustable screw 40 acting through a relatively strong compression spring 42. When screw 40 is threaded into cylinder 34, spring 42 acts on piston 38, thereby moving detent 36 into cavity 12 and compressing insert 20. The additional amount of compression will cause the insert to tightly grip rod 28 and lock the rod in position. When the detent is released, the pressure on insert 20 is reduced and rod 28 may again be moved axially.

The modification illustrated in Figure 4 includes a housing 110 in one end of which a cavity 112 is formed. A cover plate 114 is secured over the cavity 112 by any suitable means such as screws 116. The resilient insert 120 is similar to the insert 20 of Figure 1 and is preferably made of the same type material. It is fitted into the cavity 112 so that it substantially fills the cavity. Cover plate 114 will retain the insert 120 in place. Housing 110 has a passage 122 extending through the web section 123 which forms one wall of the cavity 112. A passage 124 is provided through insert 120 and another passage 126 is provided through cover plate 114. All three passages are in axial and circumferential alignment. The rod 128, which is the member to be locked in position, extends through passages 122, 124, and 126. The continual passage formed with these passages as the sections thereof is closely fitted to the rod 128 so that the rod is permitted to reciprocate axially relative to the other portions of the mechanism.

A set screw 130 provides the rough adjustment for hydraulic pressure exerted by the confined insert 120 as before. A second device is again provided to control the hydraulic effect of the insert 120 on the rod 128. The construction of this device is generally similar to that of Figure 1. It includes the bushing 132, the cylinder 134 which is secured to cover plate 114 by one or more of the screws 116, and the detent 136, which is extendable through bushing 132 and into cavity 112. Cylinder 134 is so aligned with the cover plate that the inner end of the cylinder bore 135 is in axial alignment with bushing 132. The detent 136 is moved by forces acting on the detent piston 138 which is reciprocable within the bore 135. The adjustable screw 140 is threaded into the outer end of bore 135 and acts through compression spring 142 against the end of piston 138 opposite dentent 136. The force acting on the piston and detent is therefore determined by the preload imposed upon spring 142.

The housing 110 is also provided with a fluid servo mechanism which is illustrated as a piston 144 which is secured to rod 128 and reciprocates within the cylinder 146 which is formed in the housing 110. A passage 148 is also formed within housing 110 and extends from a point adjacent lower end 150 of cylinder 146 to the upper surface of the housing 110 where cover plate 114 is secured. A passage 152 connects the upper portion 154 of cylinder 146 to passage 148 through a check valve 156. The check valve will permit fluid flow from the upper cylinder portion 154 to passage 148. Passage 158 connects the lower portion 150 of cylinder 146 with passage 148 and is provided with a similar check valve 160. The check valve permits fluid flow from cylinder portion 150 into passage 148. A passage 162 formed in cover plate 114 registers with passage 148 and forms a continuation thereof. Passage 162 in turn is connected to passage 164 in the body cylinder 134 and leads to the lower end of cylinder bore 135 so that the fluid from passage 148 may be imposed upon the lower surface of piston 138. A suitable exhaust 166 may be provided at any convenient point in passage 148 or therebeyond in order to exhaust fluid from bore 135. The exhaust 166 is illustrated as having a restriction 168 therein which will permit the imposition of a substantial fluid pressure in passage 148 acting upon piston 138 so long as fluid under pressure is supplied in either portion of cylinder 146. The relatively small amount of fluid exhausted through exhaust 166 may be returned to a sump if it is desired to reclaim the fluid so exhausted.

When the mechanism is at rest and in the locked position, no fluid pressure is required on either side of piston 144 to hold rod 128 in the desired position. This is accomplished through the use of the hydraulic locking effect of insert 120 when detent 136 is moved into cavity 112 to compress the insert. The detent is normally held in this position by the force of spring 142. If the rod 128 is to be moved downwardly, for example, fluid under pressure may be introduced into upper portion 154 of cylinder 146 through the fluid inlet 170. The fluid will move the check valve 156 and flow into passage 148 through passage 152. While a small amount of the fluid may be passing through the exhaust passage 166, the restriction 168 is sufficient to keep such flow to a minimum. The fluid therefore passes through passages 162 and 164 and, as pressure builds up on piston 144, it is also imposed upon piston 138. The pressure in bore 135 will oppose the force of spring 142 and move the detent 136 out of the cavity to unlock rod 128.

When the rod 128 reaches the desired axially displaced position, the supply of fluid pressure is cut off. Check valve 156 may close and the fluid under pressure in the lower portion of bore 135 and in passages 148, 162 and 164 will be exhausted through the restriction 168 in exhaust passage 166. Piston 138 will move downwardly under the force of spring 142 and detent 136 will again actuate the lock mechanism.

In a similar manner, the lock mechanism is unlocked when rod 128 is to be moved upwardly by the imposition of fluid pressure in lower portion 150 of chamber 146 through opening 172. Check valve 160 will be opened and check valve 156 will be closed by the pressure in passage 148 so that fluid pressure is again imposed upon piston 138 to unlock the mechanism. The mechanism is again locked in the same manner as before.

This modification is especially applicable to mechanisms in which the rod 128 is to be held in a desired position for a period of time. In the past such mechanisms have usually required a valve which would trap fluid under pressure in one end or the other of chamber 146 so as to hold piston 144 in the desired position. Such systems are generally unsatisfactory since sufficient fluid leakage may take place to soon permit the movement of rod 128 under a relatively small force. The system now disclosed overcomes this objection by providing a lock system which is independent of the actuating fluid for the servo in order to maintain the locked condition. It can be readily seen that the invention may be applied to window regulating mechanisms and will effectively prevent the movement of the window by an exterior force even though a substantial period of time has elapsed since the fluid servo was last actuated. The mechanism may be used when either a liquid or a gas such as air is used as the power transmission agent.

The modification illustrated in Figure 5 shows a housing 210 having an insert 220 within the housing cavity 212 in a manner similar to the other modifications. The initial setting of the lock mechanism is adjusted by the screw 230 as before, with the screw being mounted in the cover plate 214 which also retains the insert within the cavity 212. The detent 236 may be an extension of the piston 238 which in turn may be attached to a movable solenoid core 239. The detent 236 is normally urged into the locked position by compression spring 242. The solenoid 243 may be energized electrically to move the detent 236 out of the cavity 212 to release the lock.

The solenoid 243 may be electrically connected to any suitable power unit 245 which may be connected to move rod 228 as desired. The power unit may be fluid actuated or may be magnetically or electrically actuated if desired. In any event, when the power unit 245 is actuated, solenoid 243 is energized to release the lock mechanism. When the power unit has completed the desired movement of rod 228, it is deenergized. Solenoid 243 is also deenergized and detent 236 again extends into the cavity 212 and acts on the insert 220 to lock rod 228 in position.

A lock mechanism has therefore been provided which is readily adjustable. The mechanism utilizes the hydraulic effect of a resilient material to lock a movable member. The locking pressure may be preset and may be controlled by simple adjustments or mechanisms responsive to controlled movement of the movable member.

What is claimed is:

1. A lock mechanism for locking an axially movable member in axial position, said mechanism comprising a housing having an enclosed cavity formed therein, a rubber-like resilient element received within and substantially filling said cavity, said housing and said resilient element having axially aligned passages extending therethrough and a member to be locked therein received through said passages and axially movable therein when unlocked, first means adjustably extendable into said cavity for first compressing said resilient element in said cavity and second means adjustably extendable into said cavity for further compressing said resilient element in said cavity and exerting a locking pressure on said member through said resilient element.

2. The mechanism of claim 1, said second means including a detent extendable into said cavity and a piston and cylinder assembly for actuating said detent to move said detent in directions into and out of said cavity.

3. Mechanism for locking a reciprocable rod in a desired axial position, said mechanism comprising a block having a cavity formed therein and a cover for said cavity and receiving said rod to be locked through a passage formed in said cover and said block, a resilient material received within and substantially filling said cavity, said material being characterized by providing a hydraulic pressure action when the volume of said cavity is reduced, a set screw threadably received in said cover and extendable into said cavity and in engagement with said material so that when the set screw is extended an additional amount into said cavity to provide initial adjustment of the locking mechanism such that the hydraulic pressure action of the resilient material approaches the locking pressure to any predetermined desired extent, said material is hydraulically compressed an amount in relation to the change in volume of said cavity, and a detent mounted in said cover and adjustably extendable into said cavity to compress said material so that said material exerts a locking hydraulic pressure against the inner surfaces of said cavity and the portion of said rod extending through said cavity, and means for moving said detent into and out of said cavity so that said material hydraulically locks said rod in an axial position when said detent extends into said cavity and releases said rod when said detent is withdrawn from said cavity.

4. Mechanism for actuating and locking a reciprocable member, said mechanism including a housing having an enclosed cavity formed therein, a plastic resilient and compressible element received within and substantially filling said cavity, said housing and said compressible element having a common passage extending therethrough, a member to be reciprocably moved in said passage and locked in a desired position relative to said passage, said member extending through said passage and having power actuating means connected thereto for moving said member when said member is in the unlocked condition, means extendable into said cavity for compressing said compressible element in said cavity and exerting a locking pressure on said reciprocating member through said compressed element, and control means for said extendable means interconnected with said power actuating means whereby said control means is operative to extend said extendable means into said cavity when said power actuating means is inoperaitve and said control means is operative to withdraw said extendable means from said cavity when said power actuating means is operative.

5. The mechanism of claim 4, said control means including a first fluid servo and said power actuating means including a second fluid servo and one-way passage means interconnecting said second servo to said first servo.

6. The mechanism of claim 4, said control means including a switch actuated by said power actuating means and electromagnetic control means moving said extendable means into and out of said cavity.

7. Mechanism for locking and unlocking a fluid servo actuated reciprocable member, said mechanism including a housing and a compressible resilient element within said housing and a passage formed through said housing and said compressible resilient element and receiving said reciprocable member therethrough and means extendable into said compressible resilient element to compress said element within said housing and hydraulically lock said compressible resilient member to said reciprocable member whereby said reciprocable member is locked in position relative to said housing, said reciprocable member having a double-acting fluid servo motor, a first passage leading from one side of said servo motor and a second passage connected therewith, a third passage leading from the other side of said fluid servo motor and connected with said second passage, one-way valve means in said first and third passages permitting fluid flow only toward said second passage, a second servo connected with and actuating said extendable means and a fourth passage connecting said second passage with said second servo to provide actuating fluid to said second servo when said double-acting servo motor is actuated, and exhaust means for said second servo.

8. Mechanism for locking and unlocking a reciprocable member intermittently and irregularly actuable by a power unit, said mechanism including a hydraulically compressible resilient element surrounding said reciprocable member and contained within a confined space, means for compressing said resilient element to lock said element to said reciprocable member, and control means for said last named means including mechanism actuated when the power unit is released to compress said resilient member and actuated when the power unit is actuated to release said resilient member.

References Cited in the file of this patent

UNITED STATES PATENTS

| | | |
|---|---|---|
| 1,815,631 | Olson et al. | July 21, 1931 |
| 2,134,756 | Gerry | Nov. 1, 1938 |
| 2,478,356 | Auten | Aug. 9, 1949 |
| 2,509,202 | Arens | May 30, 1950 |

UNITED STATES PATENT OFFICE
CERTIFICATION OF CORRECTION

Patent No. 2,972,263  February 21, 1961

Eugene W. Hines

It is hereby certified that error appears in the above numbered patent requiring correction and that the said Letters Patent should read as corrected below.

In the grant, lines 1, 2 and 3, for "Eugene W. Hines, of Davison, Michigan," read -- Eugene W. Hines, of Davison, Michigan, assignor to General Motors Corporation, of Detroit, Michigan, a corporation of Delaware, --; line 12, for "Eugene W. Hines, his heirs" read -- General Motors Corporation, its successors --; in the heading to the printed specification, line 3, for "Eugene W. Hines, 9217 Davison Road, Davison, Mich." read -- Eugene W. Hines, Davison, Mich., assignor to General Motors Corporation, Detroit, Mich., a corporation of Delaware--; column 1, line 21, for "axail" read -- axial --; column 3, line 4, for "dentent" read -- detent --; column 5, line 32, for "inoperaitve" read -- inoperative --.

Signed and sealed this 11th day of July 1961.

(SEAL)
Attest:
ERNEST W. SWIDER
Attesting Officer

DAVID L. LADD
Commissioner of Patents